(12) United States Patent
Ohashi

(10) Patent No.: US 7,855,842 B2
(45) Date of Patent: Dec. 21, 2010

(54) ZOOM LENS UNIT, IMAGING APPARATUS AND PORTABLE INFORMATION TERMINAL DEVICE

(75) Inventor: Kazuyasu Ohashi, Funabashi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/490,561

(22) Filed: Jun. 24, 2009

(65) Prior Publication Data

US 2010/0007967 A1   Jan. 14, 2010

(30) Foreign Application Priority Data

Jul. 8, 2008   (JP)   ............................. 2008-178381

(51) Int. Cl.
 *G02B 15/14* (2006.01)
 *G02B 15/22* (2006.01)
(52) U.S. Cl. ...................................... 359/687; 359/686
(58) Field of Classification Search ................. 359/676, 359/686, 687
See application file for complete search history.

(56) References Cited

U.S. PATENT DOCUMENTS

| | | | |
|---|---|---|---|
| 5,153,779 A | 10/1992 | Ohashi | |
| 5,398,135 A | 3/1995 | Ohashi | |
| 5,576,891 A | 11/1996 | Ohashi | |
| 5,581,319 A | 12/1996 | Ohashi | |
| 5,617,254 A | 4/1997 | Ohashi | |
| 5,630,188 A | 5/1997 | Ohashi | |
| 5,687,401 A | 11/1997 | Kawamura et al. | |
| 5,930,056 A | 7/1999 | Ohashi | |
| 6,353,506 B1 | 3/2002 | Ohashi | |
| 6,414,799 B1 | 7/2002 | Uzawa et al. | |
| 6,525,885 B2 | 2/2003 | Ohashi | |
| 6,538,825 B1 | 3/2003 | Sun | |
| 6,747,818 B2 | 6/2004 | Ohashi et al. | |

(Continued)

FOREIGN PATENT DOCUMENTS

EP   1 355 272 A1   10/2003

(Continued)

OTHER PUBLICATIONS

Extended European Search Report and Search Opinion, Oct. 28, 2009.

*Primary Examiner*—Darryl J Collins
(74) *Attorney, Agent, or Firm*—Dickstein Shapiro LLP

(57) ABSTRACT

A zoom lens unit including, in order from an object side to an image surface side: a first lens group having a positive refracting power; a second lens group having a negative refracting power; a third lens group having a positive refracting power; and a fourth lens group having a positive refracting power, wherein when changing magnification from a wide-angle end to a telephoto end, an interval between the first lens group and the second lens group increases, an interval between the second lens group and the third lens group decreases, and an interval between the third lens group and the fourth lens group increases, wherein when performing focusing on a close range object at least at the telephoto end, with reference to a focused state on an infinite object, the first lens group and the second lens group are fixed, the third lens group is capable of being moved to the image surface side, and the fourth lens group is capable of being moved to the object side.

18 Claims, 10 Drawing Sheets

U.S. PATENT DOCUMENTS

| | | |
|---|---|---|
| 6,771,433 B2 | 8/2004 | Ohashi |
| 6,829,102 B2 | 12/2004 | Ohashi et al. |
| 6,839,183 B2 | 1/2005 | Ohashi |
| 6,839,185 B2 | 1/2005 | Ohashi |
| 6,995,921 B2 | 2/2006 | Ohashi |
| 7,038,858 B2 | 5/2006 | Ohashi |
| 7,106,521 B2 * | 9/2006 | Hoshi ........................ 359/687 |
| 7,151,638 B2 | 12/2006 | Ohashi |
| 7,164,542 B2 | 1/2007 | Ohashi |
| 7,379,249 B2 | 5/2008 | Ohashi |
| 2002/0008760 A1 | 1/2002 | Nakamura |

FOREIGN PATENT DOCUMENTS

| | | |
|---|---|---|
| EP | 1 841 233 A1 | 10/2007 |
| EP | 1 914 582 A1 | 4/2008 |
| JP | 2665878 B2 | 6/1997 |
| JP | 2001-59938 A | 3/2003 |
| JP | 2008-26837 A | 2/2008 |

* cited by examiner

WIDE-ANGLE END

INTERMEDIATE
FOCAL LENGTH

TELEPHOTO
END

ZOOM LENS UNIT, IMAGING APPARATUS AND PORTABLE INFORMATION TERMINAL DEVICE

CROSS-REFERENCE TO THE RELATED APPLICATION

The entire contents of Japanese patent application No. JP 2008-178381 filed on Jul. 8, 2008, of which the convention priority is claimed in this application, are incorporated hereinto by reference.

BACKGROUND OF THE INVENTION

1. Field of the Invention

The present invention relates to a zoom lens unit, an imaging apparatus and a portable information terminal device including the zoom lens unit.

2. Description of the Related Art

In recent years, demands from users regarding functions of imaging apparatuses (for example, digital cameras) have increased. Especially, requirements of high-quality picture performance and compactness for digital cameras need to be improved.

Therefore, both high performance and compactness have naturally been required for a zoom lens unit used as a photographing lens.

From the viewpoint of compactness of a zoom lens unit, firstly it is necessary to shorten a total length of the zoom lens unit (a distance from a lens surface nearest to an object side to an image surface) when using it. In addition, it is important to shorten a thickness of each lens group to suppress a total length of the zoom lens unit when the lens unit is collapsed.

From the viewpoint of high performance of a zoom lens unit, at least a resolution corresponding to an image pickup device having 10 million pixels over all a zoom area is necessary for the zoom lens unit. In addition, preferably a magnification ratio as great as possible is desired. In fact, a zoom lens unit with a focus length of about 28-200 mm (about 7.1 times) in terms of a 35-mm film camera is considered to be capable of responding to almost all general photographing conditions.

In addition, many users require a photographing lens with wide-angle capability, and it is desirable that a half-field angle of a zoom lens unit at a wide-angle end be 38 degrees or more. The half-field angle of 38 degrees corresponds to a focal length of 28 mm in terms of a 35-mm film camera (so-called Leica version).

Furthermore, a macro photography function is one of the demands of the user for the zoom lens unit. The macro photography function is a function which is capable of focusing on a subject located in a closer range than a range of subject distance which is capable of being focused on in usual photographing, and capable of photographing, and it is necessary to obtain a higher image magnification (a wide magnification capability).

Many kinds of zoom lens units for a digital camera are possible. As a kind of zoom lens unit which is suitable for compactness and high magnification, the following zoom lens unit is known from JP 2008-26837 A and JP 2001-059938 A, which includes, in order from an object side, a first lens group having a positive refracting power; a second lens group having a negative refracting power; a third lens group having a positive refracting power; a fourth lens group having a positive refracting power, and when changing magnification from a wide-angle end to a telephoto end, an interval between the first lens group and the second lens group increases, an interval between the second lens group and the third lens group decreases, and an interval between the third lens group and the fourth lens group increases.

Zoom lens units described in JP 2008-26837 A and JP 2001-059938 A, in concrete embodiments, have achieved compactness, high performance, wide field angle and high magnification, and met the demands of the users.

Recently, the macro photography function in a state where a focus length is comparatively long (so-called tele macro function) is a demand for a digital camera by users. This is because, with the tele macro function, by enabling the macro photographing in a state where the focal length is long (a field angle is narrow), even with a same image magnification, there are advantages such as distortion of a subject image by perspective can be suppressed, a working distance can be secured, and a degree of freedom of lighting or the like is increased.

JP 2001-059938 A discloses a zoom lens unit which has four lens groups with positive/negative/positive/positive refracting power, and has a macro photography function, and even though the macro photography function is sufficient, there is still room for improvement in the tele macro photography function.

SUMMARY OF THE INVENTION

At least an object of the present invention is to accomplish a tele macro function by a zoom lens unit having four lens groups of positive/negative/positive/positive. The zoom lens unit according to the present invention can achieve sufficient high performance, high magnification ratio, and wide field angle, and can accomplish sufficient tele macro function.

Another object of the present invention is to provide, for example, an imaging apparatus and a portable information terminal device including the above-mentioned zoom lens unit.

In light of the above mentioned, the present invention proposes, for example, a zoom lens unit including, in order from an object side to an image surface side: a first lens group having a positive refracting power; a second lens group having a negative refracting power; a third lens group having a positive refracting power; and a fourth lens group having a positive refracting power, and when changing magnification from a wide-angle end to a telephoto end, an interval between the first lens group and the second lens group increases, an interval between the second lens group and the third lens group decreases, and an interval between the third lens group and the fourth lens group increases.

In addition, an aperture stop is disposed between the second lens group and the third lens group.

The present invention further proposes, for example, an imaging apparatus which includes the above-mentioned zoom lens unit as a photographing optical system.

The present invention further proposes, for example, a portable information terminal device including the above-mentioned imaging apparatus.

BRIEF DESCRIPTION OF THE DRAWINGS

The invention will be described further below with reference to exemplary embodiments and the accompanying schematic drawings, in which.

DETAILED DESCRIPTION OF THE PREFERRED EMBODIMENTS

Figure 1:
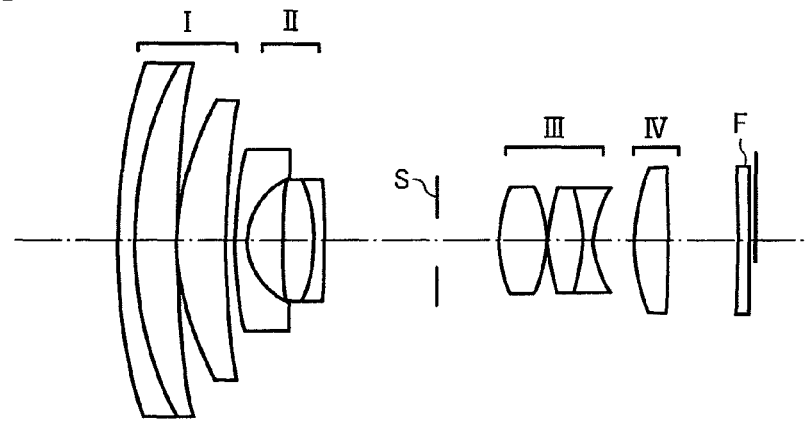
FIG. 1 is a cross-section view illustrating a structure of a zoom lens unit and movements of lens groups when changing magnification according to a first embodiment of the present invention.
Figure 1:
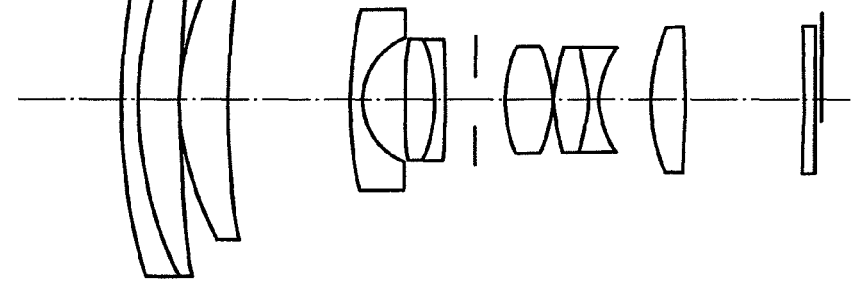
Figure 1:
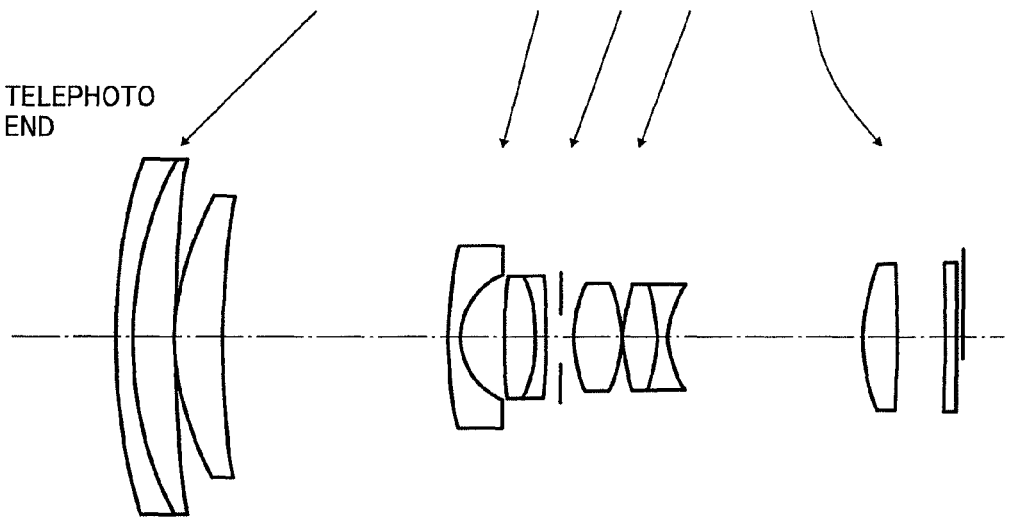

FIG. 1 illustrates a first embodiment of a zoom lens unit including a plurality of lens groups according to the present invention. This embodiment concerns a first example explained later.

In FIG. 1, the upper figure illustrates an arrangement of the plurality of lens groups at a wide-angle end, the middle figure illustrates an arrangement of the plurality of lens groups at an intermediate focal length, and the lower figure illustrates an arrangement of the plurality of lens groups at a telephoto end.

Each of arrows in FIG. 1 corresponding to lens groups (I-IV) and an aperture stop (S) indicates a displacement of each lens group of the plurality of lens groups (I-IV) and the aperture stop (S) when changing magnification from the wide-angle end to the telephoto end. Reference F presents various filters as a single transparent plate.

As illustrated in FIG. 1, the zoom lens unit according to the first embodiment includes, in order from an object side (the left side in FIG. 1) to an image surface side: a first lens group (I) having a positive refracting power; a second lens group (II) having a negative refracting power; a third lens group (III) having a positive refracting power; a fourth lens group (IV) having a positive refracting power, and when changing magnification from the wide-angle end (the upper figure in FIG. 1) to the telephoto end (the lower figure in FIG. 1), an interval between the first lens group (I) and the second lens group (II) increases, an interval between the second lens group (II) and the third lens group (III) decreases, and an interval between the third lens group (III) and the fourth lens group (IV) increases. In addition, an aperture stop (S) is disposed between the second lens group (II) and the third lens group (III).

Figure 2:
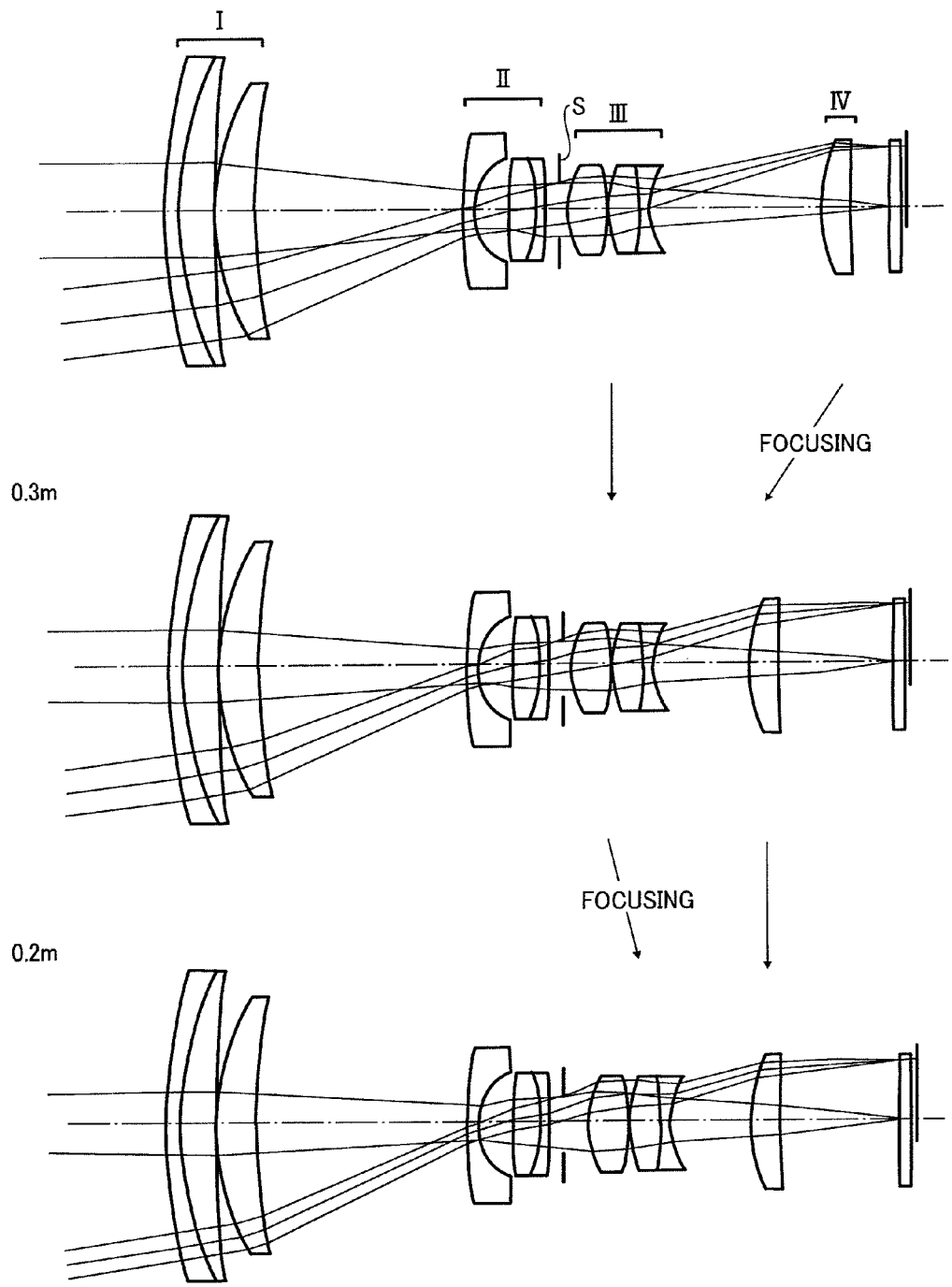
FIG. 2 is a ray diagram illustrating a focusing method at a telephoto end, of the zoom lens unit according to the first embodiment.

FIG. 2 illustrates focusing at the telephoto end of the zoom lens unit illustrated in FIG. 1.

When performing focusing on a close range object at the telephoto end, with reference to a focused state on an infinite object (the upper figure in FIG. 2), the first lens group (I) and the second lens group (II) are fixed, the third lens group (III) is capable of being moved to the image surface side, and the fourth lens group (IV) is capable of being moved to the object side.

When performing the focusing on the close range object at the telephoto end, generally, only the fourth lens group (IV) is moved to the object side (from the upper figure to the middle figure in FIG. 2). When the focusing becomes impossible to be accomplished by only moving the fourth lens group (IV), the third lens group (III) is moved to the image surface side to perform the focusing (from the middle figure to the lower figure in FIG. 2).

A focusing range of the zoom lens unit at least at the telephoto end includes a first range in which focusing on a subject located in a region from infinity to a specific range is possible, and a second range in which focusing on a subject located in a closer range including the specific range is possible. When the subject is in the first range, only the fourth lens group is moved to the object side to perform the focusing, and when the subject is in the second range, after the third lens group is moved to a position which is different from that when the focusing is performed on a subject located in the first range and is fixed, the fourth lens group is moved to the object side, to perform the focusing.

Here, "the second range including the specific range in the first range" means that, the first range and the second range overlap each other, and the overlapping area includes the specific range.

In addition, for the zoom lens unit, a maximum image magnification at the telephoto end, i.e., $\beta_{Tmax}$ satisfies formula (1)

$$-0.5 < \beta_{Tmax} < -0.1 \qquad (1)$$

If the parameter of the formula (1), $\beta_{Tmax}$, is larger than $-0.1$, which is an upper limit of the formula (1), a tele macro function having a sufficient image magnification is not exactly secured. If the parameter $\beta_{Tmax}$ is smaller than $-0.1$ (larger as an absolute value), the zoom lens unit can then perform the tele macro function.

On the other hand, if the parameter, $\beta_{Tmax}$ is smaller than $-0.5$, which is a lower limit of the formula (1), there is a possibility of deterioration of the usability, such as the image magnification becoming much too large, great aberration being generated and an image deteriorating, and a problem of blurring of shift direction occurs in handheld photographing.

In addition, for the zoom lens unit, an imaging magnification of the third lens group in a focused state on the infinite object at the telephoto end, i.e., $M_{3GT}$, and an imaging magnification of the fourth lens group in the focused state on the infinite object at the telephoto end, i.e., $M_{4GT}$, satisfy formula (2)

$$-1.0 < (1-M_{3GT}^2) \times M_{4GT}^2 < -0.3 \qquad (2)$$

If the parameter of the formula (2): $(1-M_{3GT}^2) \times M_{4GT}^2$ is larger than $-0.3$, which is an upper limit of the formula (2), a displacement of the third lens group when performing the focusing on the close range object at the telephoto end becomes too large, and the miniaturization of the zoom lens unit and the simplification of a lens displacement mechanism become difficult.

On the other hand, if the parameter $(1-M_{3GT}^2) \times M_{4GT}^2$ is smaller than −1.0, which is a lower limit of the formula (2), when performing the focusing on the close range object at the telephoto end, a ratio of a displacement of an image surface (a shift length of focus) to the displacement of the third lens group becomes too great, the third lens group needs to be moved finely, and a load to the lens displacement mechanism increases.

The zoom lens unit of the first embodiment satisfies formulae (1) and (2), as presented in a first example explained later. In addition, as illustrated in FIG. 1, the fourth lens group (IV) is moved when changing magnification, and at the telephoto end a position of the fourth lens group (IV) in a focused state on the infinite object locates nearest to the image surface side (the lower figure in FIG. 1). That is to say, at each magnification ratio, in a displacement trajectory accompanied with the changing magnification, at the telephoto end the fourth lens group (IV) focused on the infinite object locates nearest to the image surface side.

Furthermore, as illustrated in FIG. 1, when changing magnification from the wide-angle end (the upper figure in FIG. 1) to the telephoto end (the lower figure in FIG. 1), each of the first lens group (I) and the third lens group (III) is moved to a corresponding position nearer to the object side at the telephoto end than that at the wide-angle end.

Figure 3:
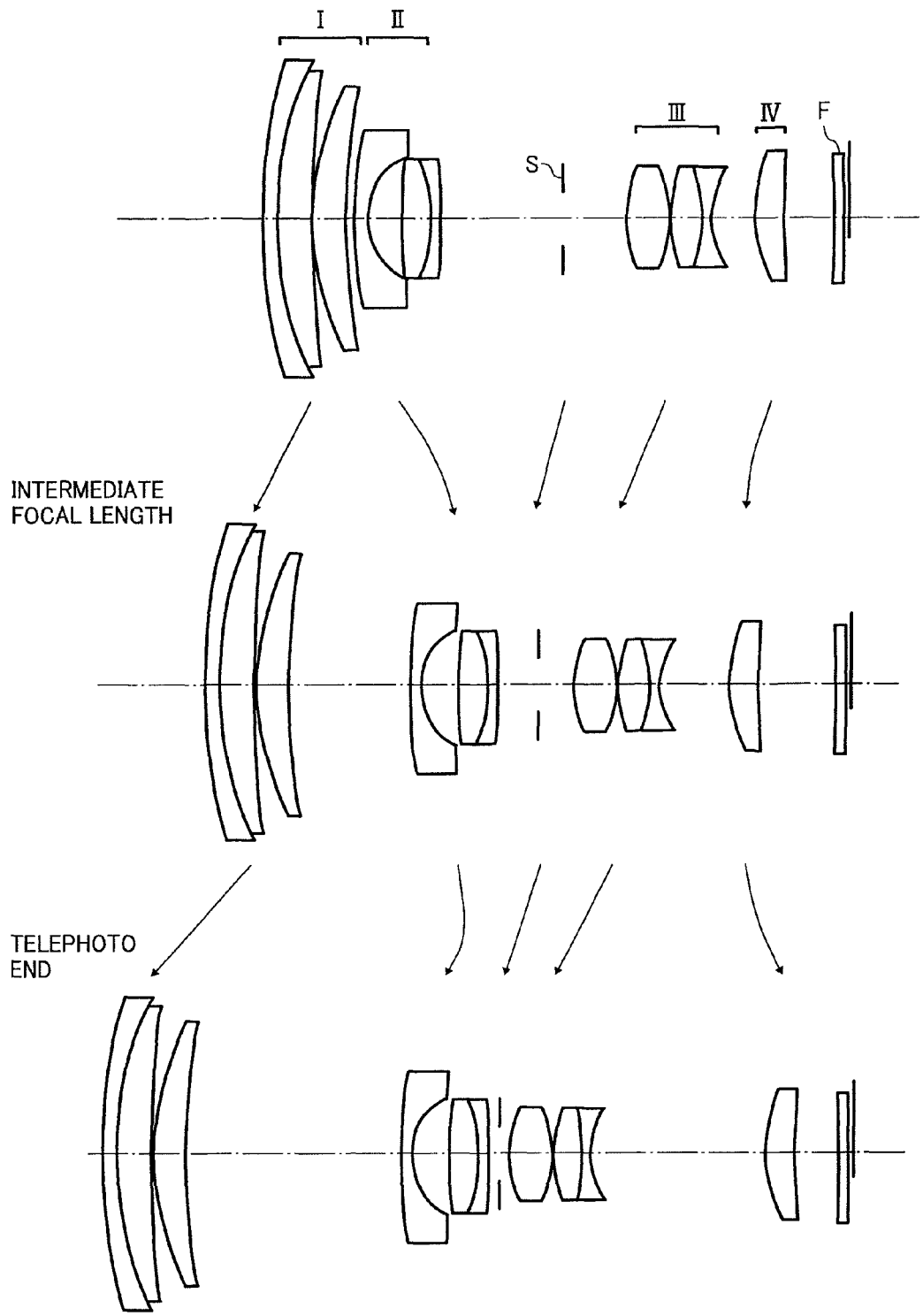
FIG. 3 is a cross-sectional view illustrating a structure of a zoom lens unit and movements of lens groups when changing magnification according to a second embodiment of the present invention.
Figure 4:
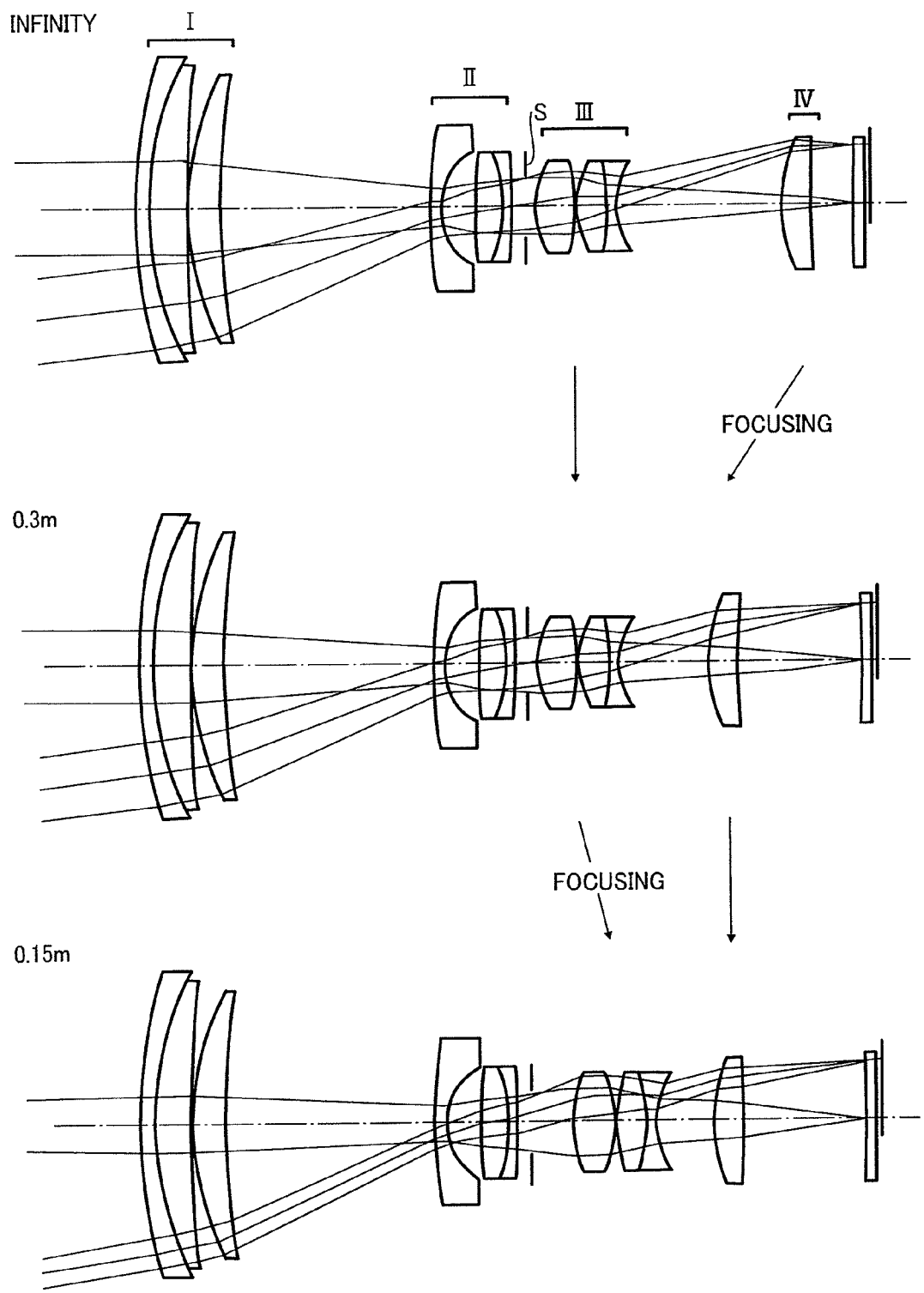
FIG. 4 is a ray diagram illustrating a focusing method at a telephoto end, of the zoom lens unit according to the second embodiment.

FIGS. 3 and 4 illustrate a second embodiment of the zoom lens unit, like FIGS. 1 and 2 respectively. This embodiment concerns a second example explained later.

As illustrated in FIG. 3, a zoom lens unit according to the second embodiment includes, in order from an object side (the left side in FIG. 3) to an image surface side: a first lens group (I) having a positive refracting power; a second lens group (II) having a negative refracting power; a third lens group (III) having a positive refracting power; a fourth lens group (IV) having a positive refracting power, and when changing magnification from a wide-angle end (the upper figure in FIG. 3) to a telephoto end (the lower figure in FIG. 3), an interval between the first lens group (I) and the second lens group (II) increases, an interval between the second lens group (II) and the third lens group (III) decreases, and an interval between the third lens group (III) and the fourth lens group (IV) increases.

FIG. 4 illustrates focusing at the telephoto end of the zoom lens unit illustrated in FIG. 3.

When performing focusing on a close range object at the telephoto end, with reference to a focusing state on an infinite object (the upper figure in FIG. 4), the first lens group (I) and the second lens group (II) are fixed, the third lens group (III) is capable of being moved to the image surface side, and the fourth lens group (IV) is capable of being moved to the object side.

When performing the focusing on the close range object at the telephoto end, generally, only the fourth lens group (IV) is moved to the object side (from the upper figure to the middle figure in FIG. 4). When the focusing becomes impossible to be accomplished by only moving the fourth lens group (IV), the third lens group (III) is moved to the image surface side to perform the focusing (from the middle figure to the lower figure in FIG. 4).

The zoom lens unit of the second embodiment satisfies formulae (1) and (2), as presented in the Example 2 explained later. In addition, as illustrated in FIG. 3, the fourth lens group (IV) is moved when changing magnification, and at the telephoto end the fourth lens group (IV) in a focused state on the infinite object locates nearest to the image surface side (the lower figure in FIG. 3).

Furthermore, as illustrated in FIG. 3, when changing magnification from the wide-angle end (the upper figure in FIG. 3) to the telephoto end (the lower figure in FIG. 3), each of the first lens group (I) and the third lens group (III) is moved to a corresponding position nearer to the object side at the telephoto end than that at the wide-angle end.

Figure 5:
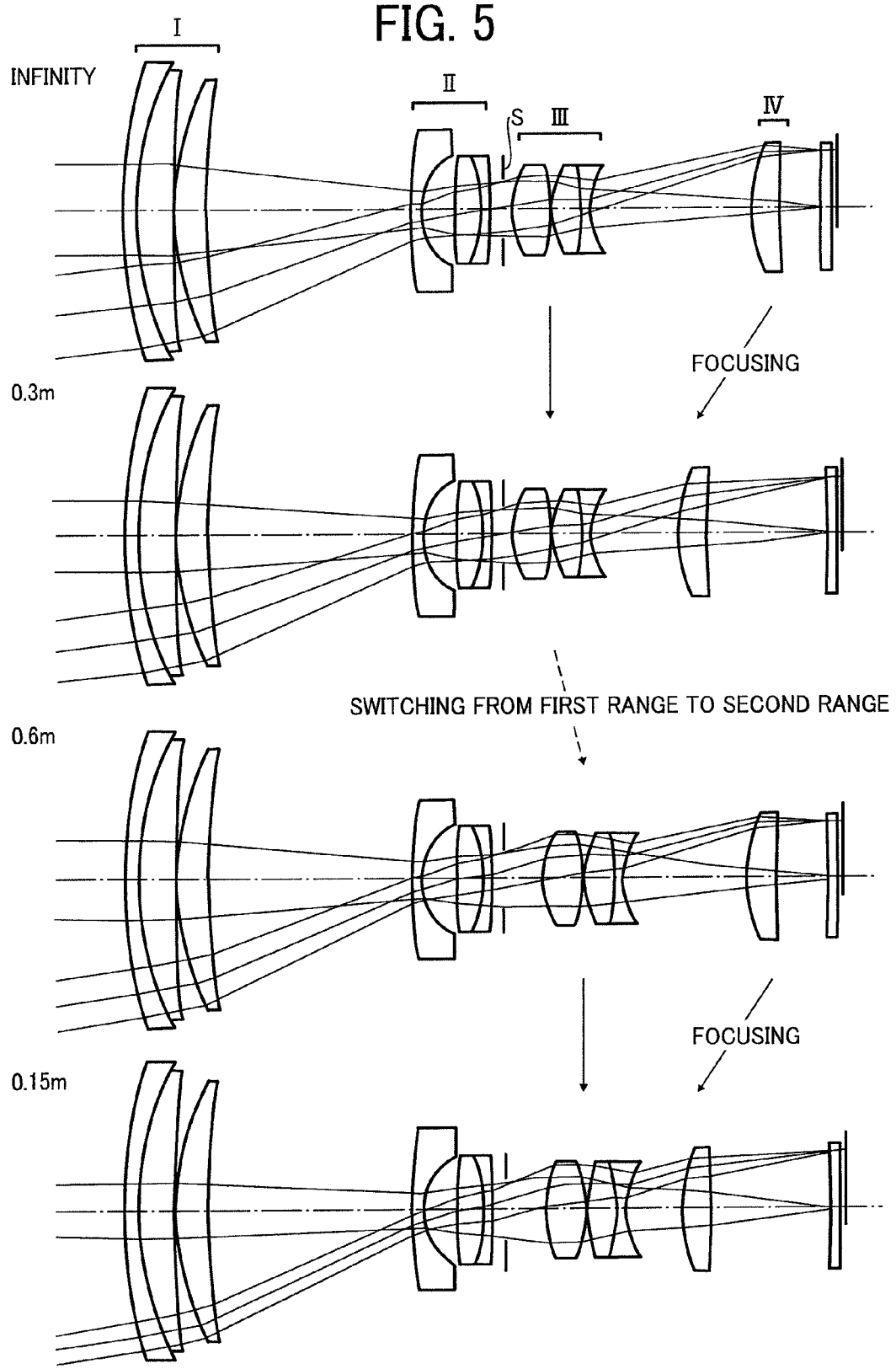
FIG. 5 is a ray diagram illustrating a focusing method at a telephoto end, of the zoom lens unit according to a third embodiment.

FIG. 5 illustrates a third embodiment of the zoom lens unit, like FIG. 2. This embodiment concerns a third example explained later.

As illustrated in FIG. 5, the zoom lens unit according to the third embodiment includes, in order from an object side (the left side in FIG. 5) to an image surface side: a first lens group (I) having a positive refracting power; a second lens group (II) having a negative refracting power; a third lens group (III) having a positive refracting power; and a fourth lens group (IV) having a positive refracting power.

For the zoom lens unit illustrated in FIG. 5, when changing magnification from a wide-angle end to a telephoto end, an interval between the first lens group (I) and the second lens group (II) increases, and an interval between the second lens group (II) and the third lens group (III) decreases, and an interval between the third lens group (III) and the fourth lens group (IV) increases.

FIG. 5 illustrates focusing at the telephoto end of the zoom lens unit.

When performing focusing on a close range object at the telephoto end, with reference to a focusing state on an infinite object (the upper figure in FIG. 5), the first lens group (I) and the second lens group (II) are fixed, the third lens group (III) is capable of being moved to the image surface side, and the fourth lens group (IV) is capable of being moved to the object side.

At least at the telephoto end, a focusing range of the zoom lens unit illustrated in FIG. 5 includes a first range in which focusing on a subject located in a region from infinity to a specific range is possible (from the upmost figure to the second figure in FIG. 5), and a second range in which focusing on a subject located in a closer range including the specific range is possible (from the third figure to the fourth figure in FIG. 5). When the subject is in the first range, only the fourth lens group (IV) is moved to the object side to perform the focusing, and when the subject is in the second range, after the third lens group (III) is moved to a position (the third figure in FIG. 5) different from that when the focusing is performed on a subject located in the first range and is fixed, the fourth lens group (IV) is moved to the object side, to perform the focusing.

The zoom lens unit of the third embodiment satisfies formulae (1) and (2), as presented in a third example explained later.

In addition, the fourth lens group (IV) is moved when changing magnification, and at the telephoto end the fourth lens group (IV) in a focused state on the infinite object locates nearest to the image surface side. Furthermore, when changing magnification from the wide-angle end to the telephoto end, each of the first lens group (I) and the third lens group (III) is moved to a corresponding position nearer to the object side at the telephoto end than that at the wide-angle end.

In each of the above-mentioned embodiments, the aperture stop (S) displaces independently of the lens groups when changing magnification, and is fixed when focusing.

An imaging device of the present invention, for example, is a digital camera which has an electronic image pickup device in which image elements are arranged in two-dimension. The camera has an image processing part which is configured to electrically correct for shading of a surrounding part of an image, when focusing on a close range object is performed at least at a telephoto end, and a third lens group is moved.

In addition, the imaging device of the present invention, for example, is a digital camera which has an electronic image pickup device in which image elements are arranged in two-dimension. The camera has an image processing part which is configured to perform a processing that does not use a predetermined range of a surrounding part of a pixel array for an output image, when focusing on a close range object is performed at least at a telephoto end, and a third lens group is moved.

Next, an embodiment of a portable information terminal device will be explained with reference to FIGS. 12A to 12C and 13.

The portable information terminal device includes an imaging apparatus (for example, a camera) as a part with a photograph function.

Figure 12A:
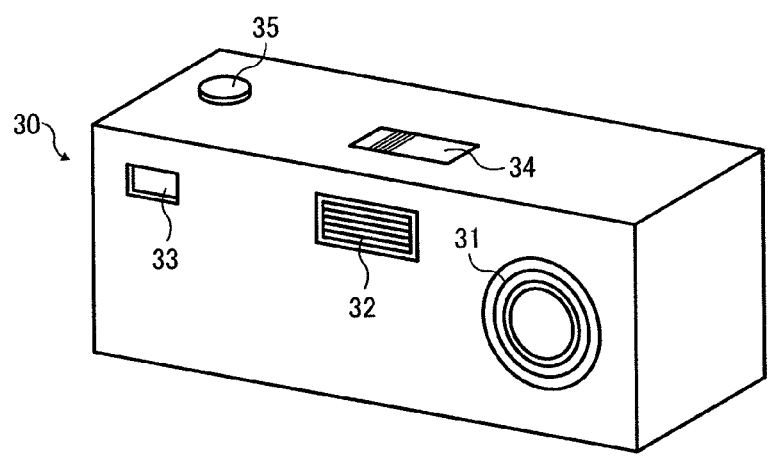
FIGS. 12A to 12C illustrate an external appearance of an embodiment of a portable information terminal device according to the present embodiment.
Figure 12B:
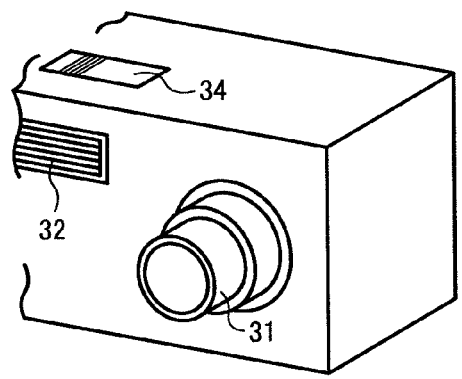
Figure 12C:
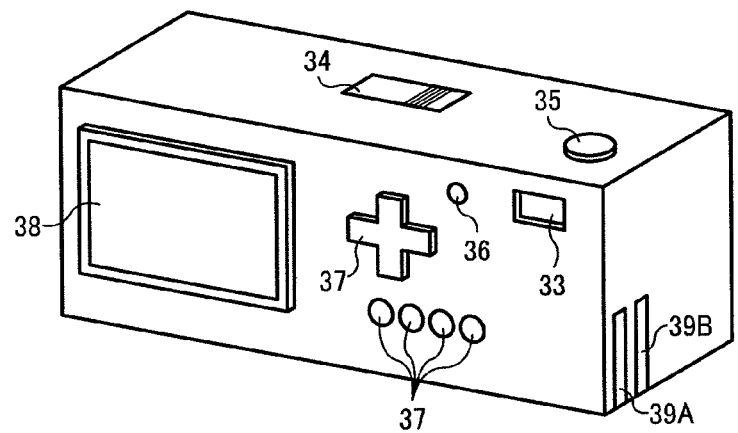
Figure 13:
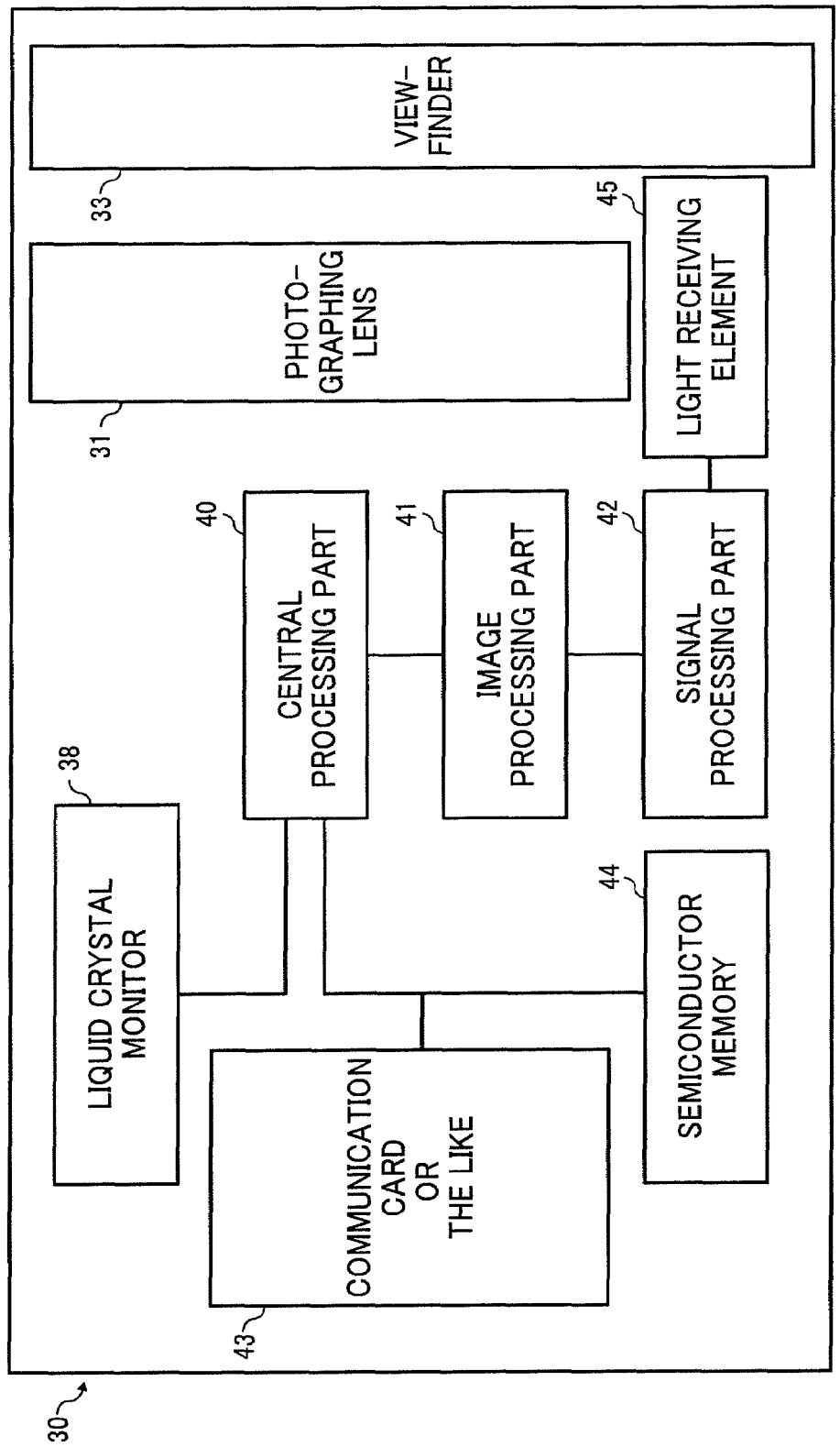
FIG. 13 is a block diagram of a system structure of the portable information terminal device according to the present invention.

FIGS. 12A to 12C illustrate an external appearance of the portable information terminal device according to an embodiment of the present invention, and FIG. 13 illustrates a system structure of the portable information terminal device.

A portable information terminal device 30 includes a photographing lens 31 and a light receiving element 45 (for example, an electronic image pickup device in which image elements are arranged in two-dimension), as illustrated in FIGS. 12A to 12C. In the portable information terminal device 30, an image of a photographing object formed by the photographing lens 31 is read by the light receiving element 45.

As the photographing lens 31, for example, any one of the above-mentioned zoom lens units, more particularly, a zoom lens unit explained in after-mentioned examples can be used.

An output from the light receiving element 45 is processed by a signal processing part 42 which receives a control of a central processing part 40, and is converted into digital information. Image information digitised is recorded in a semiconductor memory 44, after receiving a predetermined image processing in an image processing part 41 which receives a control of the central processing part 40.

A liquid crystal monitor 38 can display an image during photographing after being image-processed in the image processing part 41, and also an image is recorded in the semiconductor memory 44. Moreover, the image recorded in the semiconductor memory 44 can be exported by using a communication card 43, etc.

Electric correction of shading, cropping of a center part of the image or the like mentioned above can be carried out by the image processing part 41.

As illustrated in FIG. 12A, when the portable information terminal device is carried, the photographing lens 31 is in a collapsed state. When a power supply switch 36 is operated by the user to turn on the power, the lens barrel extends as illustrated in FIG. 12B.

At this time, inside the lens barrel, each lens group of the zoom lens unit is disposed, for example, at a corresponding position at the wide-angle end, by operating a zoom lever 34, the arrangement of each lens group changes and changing magnification to the telephoto end can be performed. In addition, variations in field angle of the photographing lens 31 are reflected in a finder 33.

The focusing is performed by pressing a shutter button 35 halfway.

The focusing, at least at the telephoto end, is performed by moving the third lens group and the fourth lens group based on a predetermined operation sequence.

The focusing other than at the telephoto end can be performed by moving only the fourth lens group.

When the shutter button 35 is further pressed, the photographing is carried out, and then the above-mentioned processings are performed.

When displaying the image recorded in the semiconductor memory 44 on the liquid crystal monitor 38, and when exporting the image by using the communication card 43, etc., operation buttons 37 illustrated in FIG. 12C can be used. The semiconductor memory and the communication card 43 or the like are inserted into the exclusive-use or general-purpose slots 39A, 39B respectively, for use.

When the photographing lens 31 is in the collapsed state, each lens group of the zoom lens unit is not necessary to be lined up on the optical axis. For example, if a mechanism in which the third lens group and/or the fourth lens group retract from the optical axis and are stored in parallel with the other lens groups is used, a further reduction in thickness of the portable information terminal device can be achieved.

In the above-mentioned portable information terminal device which has the camera as a part with the photograph function, the zoom lens unit of Embodiments 1-3 can be used as the photographing lens 31, and a compact, high image quality portable information terminal device with camera function which is equipped with the light receiving element 45 of 10 million pixels or more, can be achieved.

EXAMPLES

Hereinafter, examples of the zoom lens unit according to the present invention will be explained in detail.

Aberration diagrams of the examples illustrate aberration diagrams in a focused state on an infinite object, and each aberration is corrected sufficiently and is capable of corresponding to a light receiving element of 10 million pixels or more.

Meanings of signs in the examples are as follows:

f: focal length of an entire zoom lens unit system

F: F-number

ω: half-field angle

R: curvature radius

D: surface distance $N_d$: refractive index $v_d$: Abbe number

K: Cone constant number of aspheric surface $A_4$: Aspheric surface coefficient of 4-order $A_6$: Aspheric surface coefficient of 6-order $A_8$: Aspheric surface coefficient of 8-order $A_{10}$: Aspheric surface coefficient of 10-order $A_{12}$: Aspheric surface coefficient of 12-order $A_{14}$: Aspheric surface coefficient of 14-order $A_{16}$: Aspheric surface coefficient of 16-order $A_{18}$: Aspheric surface coefficient of 18-order The aspheric surface in the examples can be expressed by the following equation, using an inverse number of paraxial curvature radius (paraxial curvature), C, a height from the optical axis, H, a depth in the optical axis direction, X, the cone constant number of aspheric surface, K, and the aspheric surface coefficients, $A_4$-$A_{18}$.

$$X = CH^2/\{1+\sqrt{(1-(1+K)C^2H^2)}\} + A_4 \cdot H^4 + A_6 \cdot H^6 + A_8 \cdot H^8 + A_{10} \cdot H^{10} + A_{12} \cdot H^{12} + A_{14} \cdot H^{14} + A_{16} \cdot H^{16} + A_{18} \cdot H^{18}$$

Example 1 f = 5.16-35.09, F = 3.49-5.49, ω = 39.34-6.50

| Surface No. | R | D | $N_d$ | $v_d$ | $\Delta\theta g, F$ | Glass |
|---|---|---|---|---|---|---|
| 01 | 37.931 | 1.00 | 1.92286 | 18.90 | 0.0386 | OHARA S-NPH2 |
| 02 | 23.364 | 2.44 | 1.60300 | 65.44 | 0.0045 | OHARA S-PHM53 |
| 03 | 69.500 | 0.10 | | | | |
| 04* | 16.909 | 2.88 | 1.77250 | 49.60 | −0.0092 | OHARA S-LAH66 |
| 05 | 51.728 | Variable(A) | | | | |
| 06* | 26.690 | 0.74 | 1.88300 | 40.76 | −0.0088 | OHARA S-LAH58 |
| 07 | 3.993 | 2.26 | | | | |
| 08 | 32.718 | 2.00 | 1.92286 | 18.90 | 0.0386 | OHARA S-NPH2 |
| 09 | −9.991 | 0.64 | 2.00330 | 28.27 | 0.0023 | OHARA S-LAH79 |
| 10* | 277.401 | Variable(B) | | | | |
| 11 | Aperture | Variable(C) | | | | |
| 12* | 6.697 | 3.08 | 1.58913 | 61.15 | −0.0043 | OHARA L-BAL35 |
| 13* | −9.190 | 0.10 | | | | |
| 14 | 10.603 | 2.13 | 1.60300 | 65.44 | 0.0045 | OHARA S-PHM53 |
| 15 | −8.995 | 0.60 | 1.69895 | 30.13 | 0.0103 | OHARA S-TIM35 |
| 16 | 4.836 | Variable(D) | | | | |
| 17* | 11.374 | 2.17 | 1.52470 | 56.20 | | Optical plastic |
| 18 | −61.183 | Variable(E) | | | | |
| 19 | ∞ | 0.80 | 1.51680 | 64.20 | | Various Filters |
| 20 | ∞ | | | | | |

In addition, a surface number represents a sequence of the surface (including a surface of the aperture) from the object side, and the surface distance D represents a distance between the surfaces on an optical axis.

Aspheric Surface

An aspheric surface is the one attached with an asterisk "*" in the above-mentioned data. It is similar in the following examples.

Fourth Surface

K=0.0

$A_4 = -2.99145 \times 10^{-6}$ $A_6 = -2.31719 \times 10^{-8}$ $A_8 = 1.30994 \times 10^{-10}$ $A_{10} = -1.04295 \times 10^{-12}$ Sixth Surface

K=0.0

$A_4 = 5.30475 \times 10^{-5}$ $A_6 = -3.02550 \times 10^{-6}$ $A_8 = 1.75806 \times 10^{-7}$ $A_{10} = -4.41619 \times 10^{-9}$ $A_{12} = -5.03303 \times 10^{-11}$ $A_{14} = 2.21259 \times 10^{-12}$ Tenth Surface

K=0.0

$A_4 = -5.72615 \times 10^{-4}$ $A_6 = 2.64313 \times 10^{-7}$ $A_8 = -1.43524 \times 10^{-6}$ $A_{10} = -4.40696 \times 10^{-8}$ Twelfth Surface

K=0.0

$A_4 = -7.86511 \times 10^{-4}$ $A_6 = 2.14725 \times 10^{-5}$ $A_8 = -1.35163 \times 10^{-6}$ $A_{10} = 4.22984 \times 10^{-8}$ Thirteenth Surface

K=0.0

$A_4 = 4.01016 \times 10^{-4}$ $A_6 = 2.39857 \times 10^{-5}$ $A_8 = -1.41367 \times 10^{-6}$ $A_{10} = 4.90779 \times 10^{-8}$ Seventeenth Surface

K=0.0

$A_4 = -8.52233 \times 10^{-5}$ $A_6 = 1.17201 \times 10^{-5}$ $A_8 = -4.70061 \times 10^{-7}$ $A_{10} = 8.05532 \times 10^{-9}$ Variable Amount

| | Wide-angle end Infinity f = 5.156 | Intermediate focal length Infinity f = 13.392 | Telephoto end Infinity f = 35.091 | Telephoto end 0.3 m f = 28.927 | Telephoto end 0.2 m f = 25.312 |
|---|---|---|---|---|---|
| A | 0.600 | 7.511 | 14.457 | 14.457 | 14.457 |
| B | 6.999 | 2.145 | 0.900 | 0.900 | 0.900 |
| C | 3.827 | 1.726 | 0.650 | 0.650 | 1.760 |
| D | 2.579 | 3.308 | 11.981 | 6.648 | 5.538 |
| E | 4.172 | 7.058 | 2.698 | 8.031 | 8.031 |

Values of parameters in each condition $\beta_{Tmax} = -0.133$ (image magnification at 0.2m)

$(1 - M_{3GT}^2) \cdot M_{4GT}^2 = -0.749$

FIG. 1 illustrates the movement of each lens group when changing magnification from the wide-angle end to the telephoto end. In addition, FIG. 2 illustrates movements of the third lens group and the fourth lens group when performing the focusing on the close range object at the telephoto end.

As illustrated in FIG. 2, in the first example, the focusing is performed by moving the fourth lens group (IV) to the object side when a subject is in a range from infinity to a subject distance of 0.3 m.

The movement of the fourth lens group (IV) to the object side reaches the limitation at the subject distance of 0.3 m, therefore, the focusing is performed by moving the third lens group (III) to the image surface side in a range of the subject distance from 0.2 to 0.3 m.

Furthermore, the above-mentioned finite distance (subject distance) represents a numeric value from the subject to the image surface. It is similar in the following examples.

Example 2 f = 5.07-34.52, F = 3.47-5.37, ω = 39.78-6.55

| Surface No. | R | D | $N_d$ | $v_d$ | $\Delta\theta g, F$ | Glass |
|---|---|---|---|---|---|---|
| 01 | 35.747 | 1.00 | 1.92286 | 18.90 | 0.0386 | OHARA S-NPH2 |
| 02 | 22.738 | 2.57 | 1.69100 | 54.82 | −0.0079 | OHARA S-LAL9 |
| 03 | 87.337 | 0.10 | | | | |
| 04 | 20.283 | 2.24 | 1.77250 | 49.60 | −0.0092 | OHARA S-LAH66 |
| 05 | 53.982 | Variable(A) | | | | |
| 06* | 38.877 | 0.74 | 1.88300 | 40.76 | −0.0088 | OHARA S-LAH58 |
| 07 | 4.391 | 2.40 | | | | |
| 08 | 37.914 | 2.09 | 1.92286 | 18.90 | 0.0386 | OHARA S-NPH2 |
| 09 | −10.647 | 0.64 | 2.00330 | 28.27 | 0.0023 | OHARA S-LAH79 |
| 10* | −542.845 | Variable(B) | | | | |
| 11 | Aperture | Variable(C) | | | | |
| 12* | 5.908 | 2.95 | 1.49700 | 81.54 | 0.0280 | OHARA S-FPL51 |
| 13* | −8.300 | 0.10 | | | | |
| 14 | 6.965 | 2.07 | 1.60311 | 60.64 | −0.0019 | OHARA S-BSM14 |
| 15 | −32.448 | 0.60 | 1.85026 | 32.27 | 0.0036 | OHARA S-LAH71 |
| 16 | 4.424 | Variable(D) | | | | |
| 17* | 10.148 | 2.17 | 1.52470 | 56.20 | | Optical plastic |
| 18 | 116.933 | Variable(E) | | | | |
| 19 | ∞ | 0.80 | 1.51680 | 64.20 | | Various Filters |
| 20 | ∞ | | | | | |

Aspheric Surface
Sixth Surface

K=0.0

$A_4$=4.12990×10$^{-5}$ $A_6$=−2.87882×10$^{-6}$ $A_8$=1.69888×10$^{-7}$ $A_{10}$=−3.90967×10$^{-9}$ $A_{12}$=−2.11481×10$^{-11}$ $A_{14}$=1.13636×10$^{-12}$

Tenth Surface

K=0.0

$A_4$=−4.44827×10$^{-4}$ $A_6$=−9.66459×10$^{-7}$ $A_8$=−3.94591×10$^{-7}$ $A_{10}$=−3.59280×10$^{-8}$

Twelfth Surface

K=0.0

$A_4$=−8.93667×10$^{-4}$ $A_6$=1.91061×10$^{-5}$ $A_8$=−1.11334×10$^{-6}$ $A_{10}$=7.66269×10$^{-8}$

Thirteenth Surface

K=0.0

$A_4$=6.00577×10$^{-4}$ $A_6$=3.02246×10$^{-5}$ $A_8$=−1.73003×10$^{-6}$ $A_{10}$=1.35009×10$^{-7}$

Seventeenth Surface

K=0.0

$A_4$=−8.12060×10$^{-5}$ $A_6$=9.50517×10$^{-6}$ $A_8$=−3.34654×10$^{-7}$ $A_{10}$=5.95659×10$^{-9}$

Variable Amount

| | Wide-angle end Infinity f = 5.072 | Intermediate focal length Infinity f = 13.168 | Telephoto end Infinity f = 34.520 | Telephoto end 0.3 m f = 28.883 | Telephoto end 0.15 m f = 22.454 |
|---|---|---|---|---|---|
| A | 0.600 | 8.259 | 14.734 | 14.734 | 14.734 |
| B | 8.629 | 3.006 | 0.900 | 0.900 | 0.900 |
| C | 4.312 | 2.532 | 0.650 | 0.650 | 2.778 |
| D | 3.201 | 4.878 | 11.790 | 6.214 | 4.086 |
| E | 3.439 | 5.377 | 3.073 | 8.649 | 8.649 |

Values of parameters in each condition $\beta_{Tmax}$=−0.166 (image magnification at 0.15m)

$(1-M_{3GT}^2)\cdot M_{4GT}^2$=−0.769

FIG. 3 illustrates the movement of each lens group when changing magnification from the wide-angle end to the telephoto end. In addition, FIG. 4 illustrates movements of the third lens group and the fourth lens group when performing the focusing on the close range object at the telephoto end.

As illustrated in FIG. 4, in the second example, the focusing is performed by moving the fourth lens group (IV) to the object side when a subject is in a range from infinity to a subject distance of 0.3 m. The movement of the fourth lens group (IV) to the object side reaches the limitation at the subject distance of 0.3 m, therefore, the focusing is performed by moving the third lens group (III) to the image surface side in a range of the subject distance from 0.15 to 0.3 m.

Example 3

In the third example, a similar lens structure to the second example is used, and a focusing method is different from that of the second example.

Therefore, structures of each lens group and movement of each lens group when changing magnification from the wide-angle end to the telephoto end in the third example are similar to those in the second example. FIG. 5 illustrates the movements of the third lens group and the fourth lens group when the focusing on the close range object is performed at the telephoto end. As illustrated in FIG. 5, in the third example, when the subject is in a region from infinity to a subject distance of 0.3 m (a first range), the focusing is carried out by moving the fourth lens group (IV) to the object side.

In addition, when the subject is in a region from a subject distance of 0.15 m to 0.6 m (a second range), the focusing is carried out by moving the third lens group (III) to a position (image surface side) different from that when the focusing is performed on a subject located in the first range and after fixing the third lens group (III) thereof, moving the fourth lens group (IV) to the object side.

Variable amounts in the third example are as follows.

Variable Amount

|  | Wide-angle end Infinity f = 5.072 | Intermediate focal length Infinity f = 13.168 | Telephoto end Infinity f = 34.520 | First range | | Second range | |
|---|---|---|---|---|---|---|---|
|  |  |  |  | Telephoto end 0.3 m f = 28.883 | | Telephoto end 0.6 m f = 26.554 | Telephoto end 0.15 m f = 22.454 |
| A | 0.600 | 8.259 | 14.734 | 14.734 | | 14.734 | 14.734 |
| B | 8.629 | 3.006 | 0.900 | 0.900 | | 0.900 | 0.900 |
| C | 4.312 | 2.532 | 0.650 | 0.650 | | 2.778 | 2.778 |
| D | 3.201 | 4.878 | 11.790 | 6.214 | | 9.100 | 4.086 |
| E | 3.439 | 5.377 | 3.073 | 8.649 | | 3.635 | 8.649 |

Values of parameters in each condition $\beta_{Tmax} = -0.166$ (image magnification at 0.15m)

$(1 - M_{3GT}^2) \cdot M_{4GT} = -0.769$

As above-mentioned, a range of the subject distance from 0.3 to 0.6 m is a range where the first range overlaps with the second range, i.e., a specific range, and each focusing method can be used to carry out the focusing.

Figure 6:
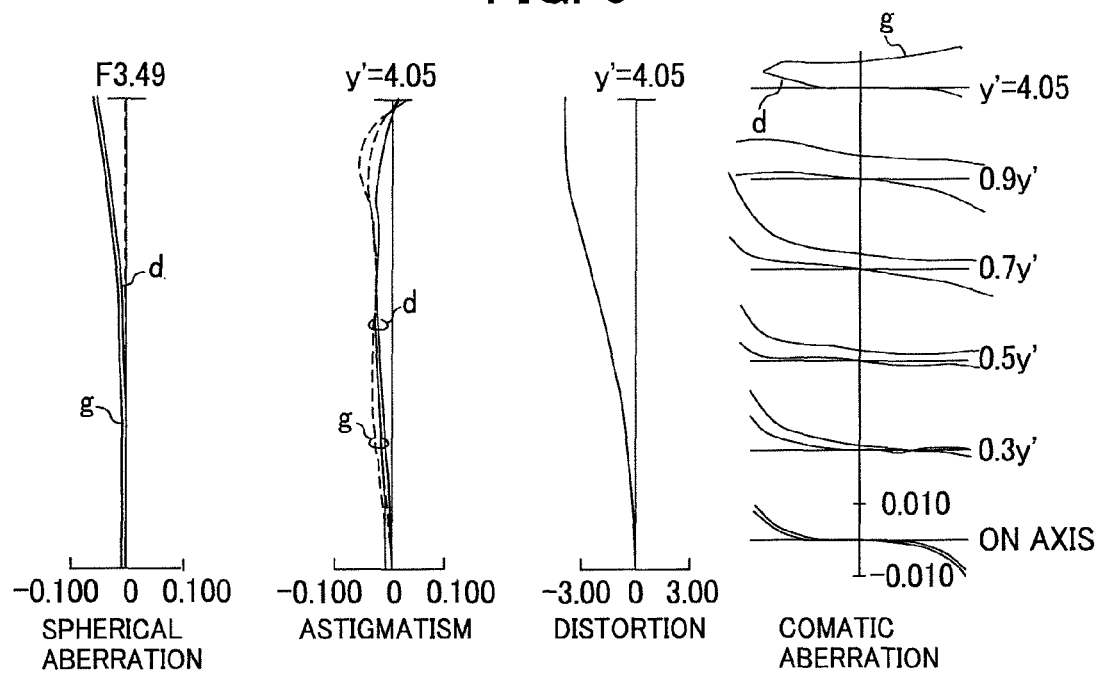
FIG. 6 illustrates aberration diagrams at a wide-angle end of a zoom lens unit according to a first example.
Figure 7:
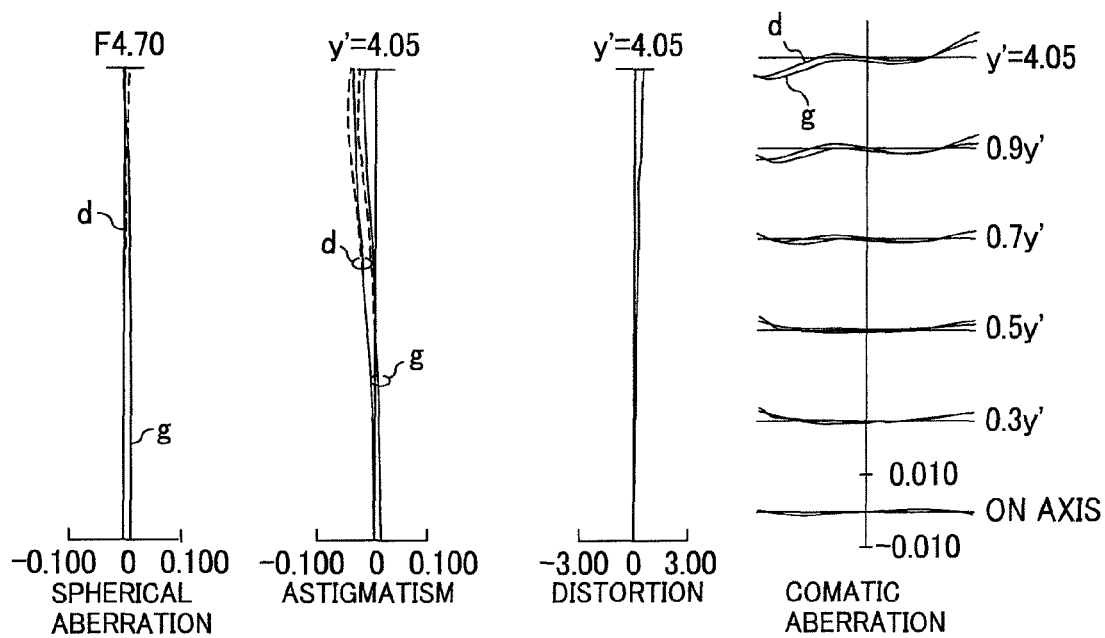
FIG. 7 illustrates aberration diagrams at an intermediate focal length of the zoom lens unit according to the first example.
Figure 8:
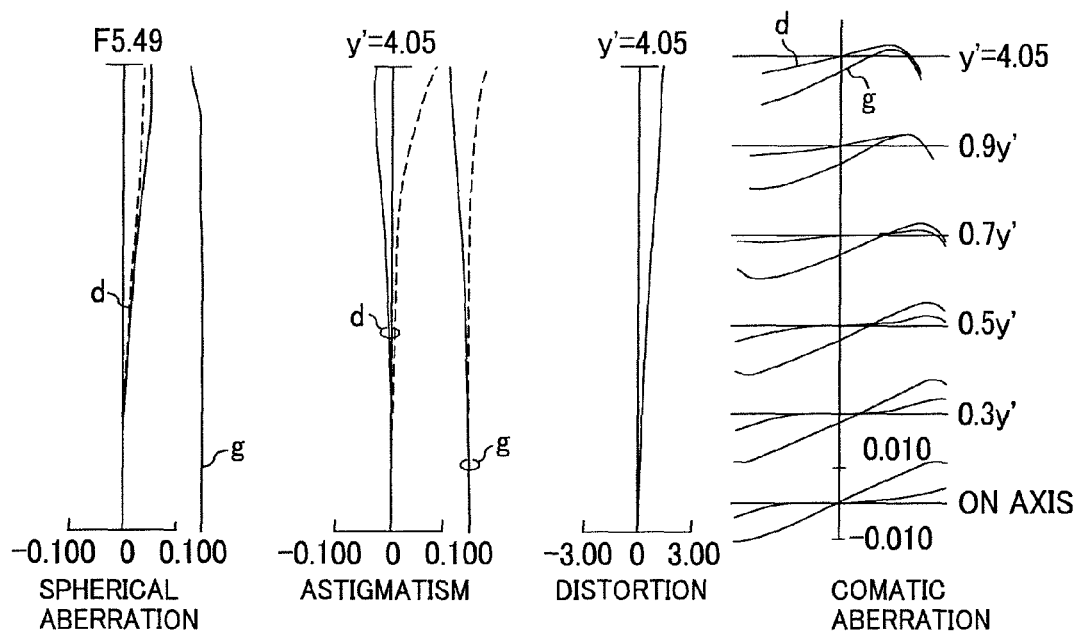
FIG. 8 illustrates aberration diagrams at a telephoto end of the zoom lens unit according to the first example.
Figure 9:
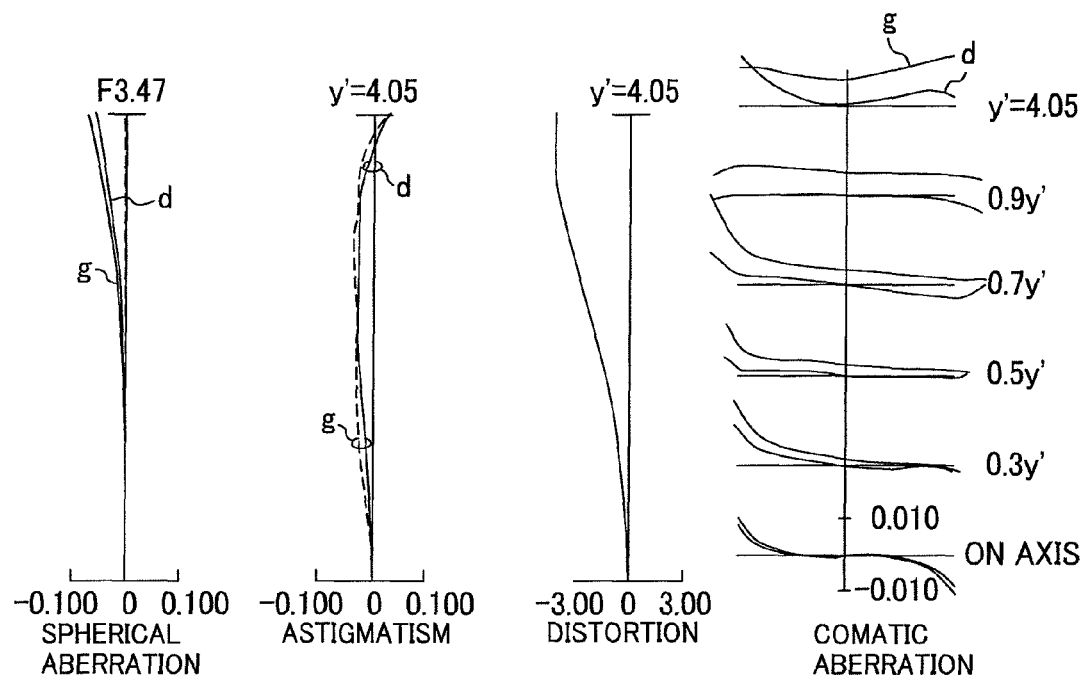
FIG. 9 illustrates aberration diagrams at a wide-angle end of the zoom lens unit according to a second example.
Figure 10:
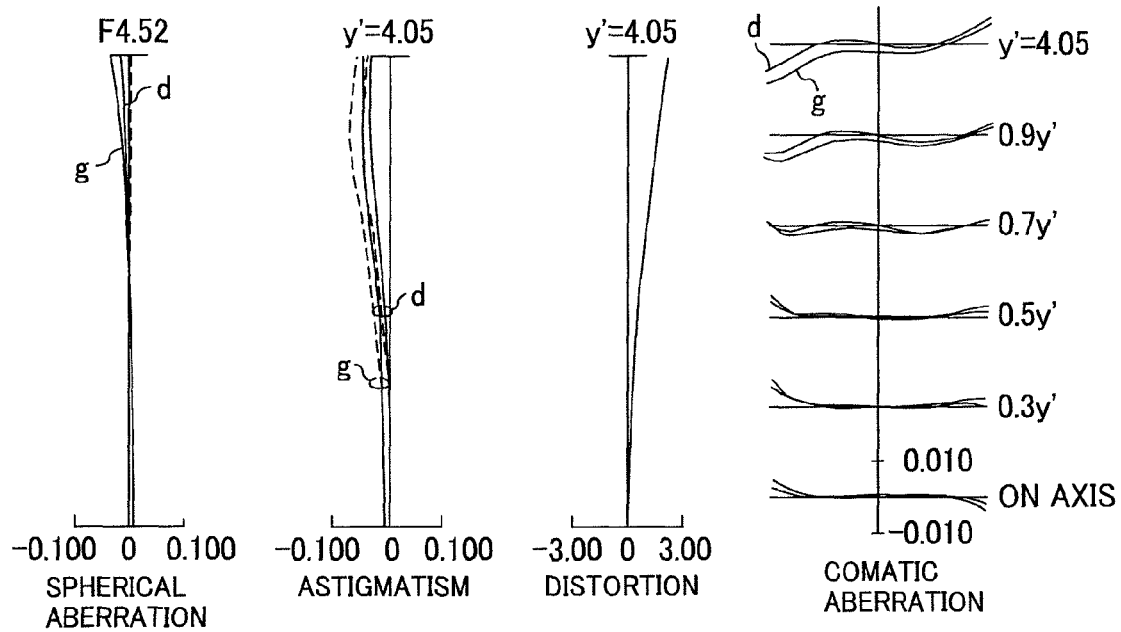
FIG. 10 illustrates aberration diagrams at an intermediate focal length of the zoom lens unit according to the second example.
Figure 11:
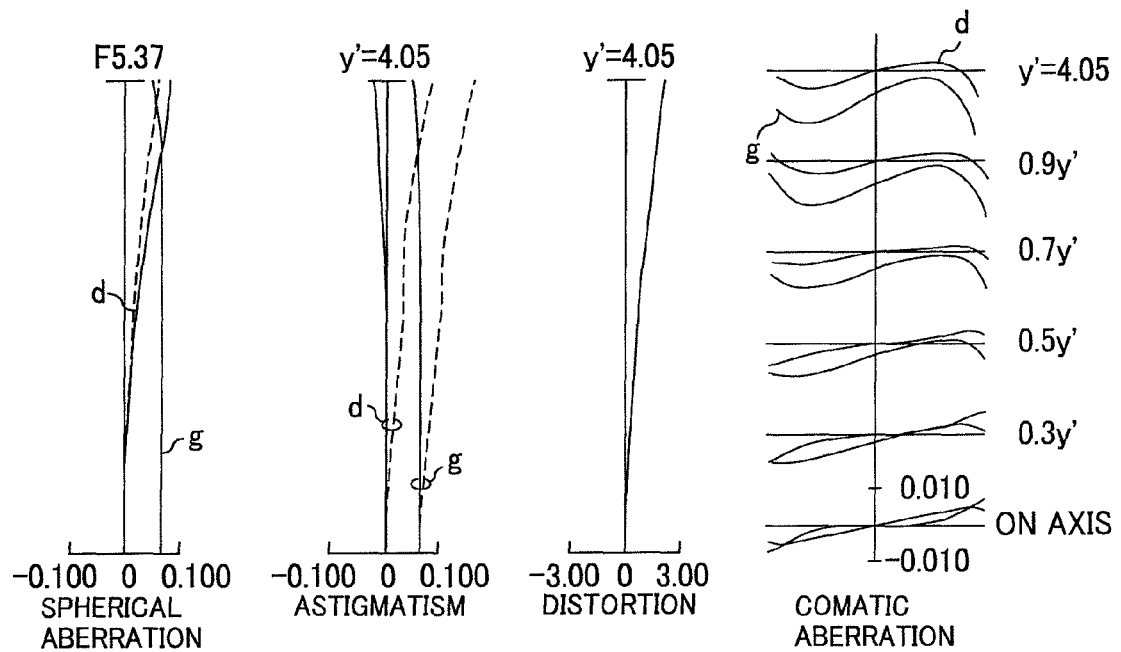
FIG. 11 illustrates aberration diagrams at a telephoto end of the zoom lens unit according to the second example.

FIGS. 6-8 illustrate aberration diagrams of the zoom lens unit according to the first example, at the wide-angle end, the intermediate focal length and the telephoto end, respectively. FIGS. 9-11 illustrate aberration diagrams of the zoom lens unit according to the second (third) example, at the wide-angle end, the intermediate focal length and the telephoto end, respectively.

These aberration diagrams, as above-stated, illustrate aberration diagrams in a focused state on the infinite object. In addition, a dashed line in a spherical aberration diagram illustrates a sine condition, a solid line in an astigmatism diagram illustrates sagittal, and a dashed line in the astigmatism diagram illustrates meridional.

In addition, in the first to third examples, Δθg, F represent extraordinary dispersibility (deviation from a standard line of partial dispersion ratio θg, F), "Glass" presents a product name of glass.

According to an aspect of the present invention, in a zoom lens unit which includes four lens groups having positive/negative/positive/positive refracting power, like a zoom lens unit of the present invention, generally, a second lens group having the negative refracting power is constructed as a so-called variator to bear a major changing magnification function. However, a third lens group having the positive refracting power is configured to share the changing magnification function, accordingly, flexible correction to aberration corrections which become difficult with a high magnification ratio can be secured.

When the third lens group shares the changing magnification function, an interval between the first lens group and the second lens group increases, and an interval between the second lens group and the third lens group decreases, and magnification (absolute values) of an image through the second lens group and magnification (absolute values) of an image through the third lens group increase. Therefore, a high magnification ratio can be met.

In such a kind of zoom lens unit, the fourth lens group is often used to carry out focusing. In this case, when focusing from infinity to a close range is carried out, the fourth lens group is moved to the object side, but it can not be moved to the object side without bound due to a limitation in a mechanism which supports and moves the lens group.

That is, there is a limitation in the displacement of the fourth lens group for the focusing. Most commonly, it can be considered that there is a physical limitation in a distance that the fourth lens group can be moved away from the image surface.

On the other hand, a necessary displacement of the fourth lens group for focusing on a subject located at a certain finite distance is required to be most great at the telephoto end. Therefore, to achieve a sufficient tele macro function, a mechanism which is capable of moving the fourth lens group away from the image surface as far as possible is needed.

According to a preferable embodiment of the present invention, in a zoom lens unit according to the present invention, at least at a telephoto end when focusing on a close range object is performed, a first lens group and a second lens group are fixed, a third lens group is capable of being moved to an image surface side, and a fourth lens group is capable of being moved to an object side, with reference to a focused state on an infinite object.

By such a focusing operation, a close range photographing which has a greater image magnification becomes possible even if there is a limitation in the displacement of the fourth lens group, and a sufficient tele macro function can be achieved. The third lens group being moved to the image surface side is not consistent with the fact that the interval between the second lens group and the third lens group decreases, and the interval between the third lens group and the fourth lens group increases when changing magnification from a wide-angle end to the telephoto end. Namely, when the focusing on the close range object is begun at the telephoto end, the third lens group is in a state near the second lens group, and the fourth lens group is in a state away from the third lens group.

In addition, by the movements of the third lens group and the fourth lens group associated with the focusing, the focal length becomes shorter than that when focusing on the infinite object, and due to the second lens group which is configured to bear the major changing magnification function being not moved (to the first lens group relatively), the focal length is kept long consistently, and the tele macro function can be achieved.

According to another preferable embodiment of the present invention, in a zoom lens unit of the present invention in which the above-mentioned operation is performed, at least at a telephoto end when focusing on a close range object is performed, generally, only a fourth lens group is moved, and when the focusing becomes impossible to be accomplished by only moving the fourth lens group, a third lens group is moved.

It is preferable that the focusing be performed in as short a time as possible. When the focusing is possible by only moving the fourth lens group, not moving the third lens group prevents complexity of a sequence of operations, and results in a reduction of a focusing time. When an individual actuator is used to move each of the third lens group and the fourth lens group, a disadvantage in power consumption occurs when driving the actuators at the same time, however, by employing the above-mentioned operation, the problem of power consumption can be avoided.

According to a further preferable embodiment of the present invention, at least at a telephoto end, a focusing range of a zoom lens unit includes a first range in which focusing on a subject located in a region from infinity to a specific range is possible, and a second range in which the focusing on a subject located in a closer range including the specific range is possible, and when the subject is in the first range, only a fourth lens group is moved to perform the focusing, and when the subject is in the second range, a third lens group is moved to a position different from that when the focusing is performed on a subject located in the first range and is fixed thereof, and then the fourth lens group is moved, to perform the focusing.

Thus, the user can set the first range and the second range demonstratively, accordingly the sequence of operations is simplified, and a reduction of the focusing time becomes possible. Moreover, because the third lens group and the fourth lens group are not moved at the same time, it is advantageous in the point of power consumption as well.

According to a further embodiment of the present invention, it is preferable that when a fourth lens group is moved during magnification, at a telephoto end, a position of the fourth lens group in a focused state on an infinite object locates nearest to an image surface side.

In the focused state on the infinite object at the telephoto end, if the fourth lens group is in a state that had moved to the object side in a movable range, a focusing range by movement of the fourth lens group is narrow. Therefore, by disposing the fourth lens group in the focused state on the infinite object to a position nearest the image surface side at the telephoto end, when the focusing on the close range object is performed at the telephoto end, the movable range of the fourth lens group can be used with most effectiveness, and combining with the movement of the third lens group, the tele macro function securing a sufficient image magnification can be achieved.

According to a further preferable embodiment of the present invention, to obtain wide field angle capability and high magnification ratio of a zoom lens unit, it is preferable to move each of a first lens group and a third lens group to a corresponding position nearer an object side at a telephoto end than that at a wide-angle end, when changing magnification from the wide-angle end to the telephoto end.

When changing magnification from the wide-angle end to the telephoto end, by greatly moving the first lens group to the object side, at the wide-angle end the height of a ray which passes through the first lens group is reduced, thus an increase in size of the first lens group associated with wide angle can be suppressed, and at the telephoto end the interval between the first lens group and the second lens group is secured to be large, and this is advantageous for the long focus length.

In addition, the changing magnification function is shared by moving the third lens group, therefore, it can secure flexibility of aberration corrections which become difficult with wide field angle and high magnification ratio. In addition, when changing magnification, movement of the third lens group itself is a common function for focusing and changing magnification and is favorable, for the zoom lens of the present invention for which moving the third lens group is necessary when performing the focusing on the close range object.

According to another aspect of the present invention, an imaging apparatus (for example, a camera) can use the above-mentioned zoom lens unit as a photographing optical system. If the camera is a digital camera which uses an electronic image pickup device in which image elements are arranged in two-dimension as an imager, a tele macro function can be enhanced further by combining with electrical processings.

First, in a case that the third lens group is moved when at least at the telephoto end the focusing is performed on the close range object, shading of a surrounding part of an image can be electrically corrected.

When the third lens group is moved to the image surface side, the focal length shortens a little, therefore the field angle increases a little, and peripheral brightness decreases.

Due to shading being generated at the surrounding part of the image by decrement of the peripheral brightness, it is desirable to correct the shading electrically. During the focusing, the decrement in the peripheral brightness increases as the third lens group is moved greatly, thus it is further desirable to change an amount of the correction of shading complying with a displacement of the third lens group. Therefore, a sufficient tele macro function can be achieved by such processing, without causing a disadvantage of enlarging the lens system for securing the peripheral brightness.

According to a preferable embodiment of the present invention, in an imaging apparatus which uses the above-mentioned zoom lens unit, in a case that the third lens group is moved when the focusing is performed on the close range object at least at the telephoto end, a predetermined range of a surrounding part of a pixel array is not used for an output image.

In the macro function it is important to enlarge the image magnification. When considering about print as a final output form of an image, by a so-called cropping, expansion factor can be raised. Therefore, the tele macro function can be improved by providing a choice that does not use the predetermined range of the surrounding part of the pixel array for the output image, and crops only the central portion of the image and use it.

If only the central portion of the image is cropped, there is one more advantage that shading of the surrounding part of the image by the decrement in the peripheral brightness mentioned above would not be a substantial problem.

According to the present invention explained above, it can provide a new compact zoom lens unit with a high magnification ratio and wide field angle, which has a resolving power corresponding to an image pickup device having 10 million pixels or more and has a sufficient tele macro function. In addition, an imaging apparatus (a camera) and a portable information terminal device with good performance can be obtained by using the above-mentioned zoom lens unit.

It should be noted that although the present invention has been described with respect to exemplary embodiments, the invention is not limited thereto. In view of the foregoing, it is intended that the present invention cover modifications and variations provided they fall within the scope of the following claims and their equivalent.

What is claimed is:

1. A zoom lens unit comprising, in order from an object side to an image surface side:
    a first lens group having a positive refracting power;
    a second lens group having a negative refracting power;
    a third lens group having a positive refracting power; and
    a fourth lens group having a positive refracting power,
    wherein when changing magnification from a wide-angle end to a telephoto end, an interval between the first lens group and the second lens group increases, an interval between the second lens group and the third lens group decreases, and an interval between the third lens group and the fourth lens group increases,
    wherein when performing focusing on a close range object at least at the telephoto end, with reference to a focused state on an infinite object, the first lens group and the second lens group are fixed, generally only the fourth lens group is moved to the object side, and when the focusing becomes impossible to be accomplished by only moving the fourth lens group, the third lens group is moved to the image surface side to perform the focusing.

2. A zoom lens unit according to claim 1, wherein the following formula is satisfied: $-1.0<(1-M_{3GT}^2)\times M_{4GT}^2<-0.3$ (2) in which $M_{3GT}$ represents an imaging magnification of the third lens group in the focused state on the infinite object at the telephoto end, $M_{4GT}$ represents an imaging magnification of the fourth lens group in the focused state on the infinite object at the telephoto end.

3. A zoom lens unit according to claim 1, wherein the fourth lens group is moved when changing magnification, and at the telephoto end a position of the fourth lens group in the focused state on the infinite object locates nearest to the image surface side.

4. A zoom lens unit according to claim 1, wherein when changing magnification from the wide-angle end to the telephoto end, each of the first lens group and the third lens group is moved to a corresponding position nearer to the object side at the telephoto end than that at the wide-angle end.

5. An imaging apparatus which comprises the zoom lens unit according to claim 1 as a photographing optical system.

6. An imaging apparatus according to claim 5, wherein the imaging apparatus is a digital camera having an electronic image pickup device in which image elements are arranged in two-dimension, and includes an image processing part which is configured to electrically correct for shading of surrounding part of an image, in a case that the third lens group is moved when the focusing is performed on the close range object at least at the telephoto end.

7. An imaging apparatus according to claim 5, wherein the imaging apparatus is a digital camera having an electronic image pickup device in which image elements are arranged in two-dimension, and includes an image processing part which is configured to perform a processing that does not use a predetermined range of a surrounding part of a pixel array for an output image, in a case that the third lens group is moved when the focusing is performed on the close range object at least at the telephoto end.

8. A portable information terminal device includes the imaging apparatus according to claim 5.

9. A zoom lens unit comprising, in order from an object side to an image surface side;
    a first lens group having a positive refracting power;
    a second lens group having a negative refracting power;
    a third lens group having a positive refracting power; and
    a fourth lens group having a positive refracting power,
    wherein when changing magnification from a wide-angle end to a telephoto end, an interval between the first lens group and the second lens group increases, an interval between the second lens group and the third lens group decreases, and an interval between the third lens group and the fourth lens group increases,
    wherein when performing focusing on a close range object at least at the telephoto end, with reference to a focused state on an infinite object, the first lens group and the second lens group are fixed, the third lens group is capable of being moved to the image surface side, and the fourth lens group is capable of being moved to the object side, and
    wherein a focusing range of the zoom lens unit at least at the telephoto end includes a first range in which focusing on a subject located in a region from infinity to a specific range is possible, and a second range in which focusing on a subject located in a closer range including the specific range is possible, wherein when the subject is in the first range, only the fourth lens group is moved to the object side to perform the focusing, when the subject is in the second range, after the third lens group is moved to a position which is different from that when the focusing is performed on a subject located in the first range and is fixed, the fourth lens group is moved to the object side, to perform the focusing.

10. A zoom lens unit according to claim 9, wherein the following formula is satisfied: $-0.5<\beta_{Tmax}<-0.1$ (1) in which $\beta_{Tmax}$ represents a maximum image magnification at the telephoto end.

11. A zoom lens unit according to claim 9, wherein the following formula is satisfied: $-1.0<(1-M_{3GT}^2)\times M_{4GT}^2<-0.3$ (2) in which $M_{3GT}$ represents an imaging magnification of the third lens group in the focused state on the infinite object at the telephoto end, $M_{4GT}$ represents an imaging magnification of the fourth lens group in the focused state on the infinite object at the telephoto end.

12. A zoom lens unit according to claim 9, wherein the fourth lens group is moved when changing magnification, and at the telephoto end a position of the fourth lens group in the focused state on the infinite object locates nearest to the image surface side.

13. A zoom lens unit according to claim 9, wherein when changing magnification from the wide-angle end to the telephoto end, each of the first lens group and the third lens group is moved to a corresponding position nearer to the object side at the telephoto end than that at the wide-angle end.

14. An imaging apparatus which comprises the zoom lens unit according to claim 9 as a photographing optical system.

15. An imaging apparatus according to claim 14, wherein the imaging apparatus is a digital camera having an electronic image pickup device in which image elements are arranged in two-dimension, and includes an image processing part which is configured to electrically correct for shading of surrounding part of an image, in a case that the third lens group is moved when the focusing is performed on the close range object at least at the telephoto end.

16. An imaging apparatus according to claim 14, wherein the imaging apparatus is a digital camera having an electronic image pickup device in which image elements are arranged in two-dimension, and includes an image processing part which is configured to perform a processing that does not use a predetermined range of a surrounding part of a pixel array for an output image, in a case that the third lens group is moved when the focusing is performed on the close range object at least at the telephoto end.

17. A portable information terminal device includes the imaging apparatus according to claim 14.

18. A zoom lens unit comprising, in order from an object side to an image surface side:

a first lens group having a positive refracting power;
a second lens group having a negative refracting power;
a third lens group having a positive refracting power; and
a fourth lens group having a positive refracting power,
wherein when changing magnification from a wide-angle end to a telephoto end, an interval between the first lens group and the second lens group increases, an interval between the second lens group and the third lens group decreases, and an interval between the third lens group and the fourth lens group increases,
wherein when performing focusing on a close range object at least at the telephoto end, with reference to a focused state on an infinite object, the first lens group and the second lens group are fixed, the third lens group is capable of being moved to the image surface side, and the fourth lens group is capable of being moved to the object side, and
wherein the following formula is satisfied; $-0.5 < \beta_{Tmax} < -0.1$ (1) in which $\beta_{Tmax}$ represents a maximum image magnification at the telephoto end.

* * * * *